United States Patent [19]

Tsang

[11] Patent Number: 5,232,152

[45] Date of Patent: Aug. 3, 1993

[54] RANGE HOOD FAN WITH ATMOSPHERIC HUMIDITY SENSOR

[76] Inventor: Richard W. B. Tsang, 4251 Frances Street, Burnaby, B.C. V5C 2P9, Canada

[21] Appl. No.: 987,933

[22] Filed: Dec. 8, 1992

Related U.S. Application Data

[63] Continuation-in-part of Ser. No. 785,125, Oct. 30, 1991, abandoned.

[51] Int. Cl.$^5$ ............................................. G05D 22/02
[52] U.S. Cl. ........................ 236/44 A; 126/299 D; 454/67; 454/343
[58] Field of Search ............. 236/44 A, 44 R; 454/67, 454/341, 343; 126/299 D

[56] References Cited

U.S. PATENT DOCUMENTS

| | | | |
|---|---|---|---|
| 3,109,358 | 11/1961 | Meyer | 98/115 |
| 3,327,610 | 9/1965 | Cole | 98/115 |
| 3,332,620 | 7/1967 | Streed | 236/44 |
| 3,719,137 | 3/1973 | Gould | 98/115 K |
| 3,768,237 | 10/1973 | Bergmark | 55/439 |
| 4,089,328 | 5/1978 | Bergmark et al. | 126/299 D |
| 4,136,822 | 1/1979 | Felter | 236/49 |
| 4,251,026 | 2/1981 | Siegel | 236/49 |
| 4,364,754 | 12/1982 | Diachuk | 55/269 |
| 4,411,675 | 10/1983 | de Castella | 55/316 |
| 4,460,122 | 7/1984 | Jardinier et al. | 236/44 A |
| 4,460,386 | 7/1984 | Diachuk | 55/92 |
| 4,500,331 | 2/1985 | Cheng | 55/406 |
| 4,700,688 | 10/1987 | Searcy et al. | 126/299 D |
| 4,922,808 | 5/1990 | Smith | 98/42.06 |
| 4,953,784 | 9/1990 | Yasufuku et al. | 236/44 A |

FOREIGN PATENT DOCUMENTS

| | | |
|---|---|---|
| 3236353 | 4/1984 | Fed. Rep. of Germany . |
| 0213628 | 9/1987 | Japan . |
| 7611004 | 7/1977 | Netherlands . |

OTHER PUBLICATIONS

Kitchen Doctor Range Hood Brochure, 1989.
Ma Ma Loh Pacific Range Hood Brochure.

*Primary Examiner*—William E. Tapolcai
*Attorney, Agent, or Firm*—Robbins, Berliner & Carson

[57] ABSTRACT

A kitchen range hood fan electrically connectable to an atmospheric humidity sensor, such as a dehumidistat. The fan motor is automatically activated when atmospheric humidity readings measured within a dwelling exceed a pre-set limit.

17 Claims, 6 Drawing Sheets

RANGE HOOD FAN WITH ATMOSPHERIC HUMIDITY SENSOR

This is a continuation-in-part of application Ser. No. 07/785,125, filed 30 Oct., 1991, now abandoned.

FIELD OF THE INVENTION

This application relates to a kitchen range hood fan electrically connectable to a humidity sensor. The fan motor is automatically activated at a low speed setting when atmospheric humidity readings measured within a dwelling exceed a pre-set limit.

BACKGROUND OF THE INVENTION

In order to increase energy efficiency, many newly constructed dwellings are insulated to substantially prevent release of heated air from the interior of the dwelling. Such air-tight dwellings may have insufficient ventilation, resulting in unacceptably high humidity levels and potentially dangerous concentrations of gases, such as formaldehyde and radon. Accordingly, if natural ventilation of the dwelling is insufficient, building codes in some jurisdictions require installation of mechanical ventilators.

PRIOR ART

At present, exhaust fans for regulating humidity levels are typically installed by building contractors in washrooms to facilitate ductwork connections. Operation of the exhaust fans may be automatically controlled by a centrally located humidity sensor, such as a dehumidistat. Dehumidistats are usually installed in a hallway or living room and may be pre-set to activate the exhaust fan when interior humidity readings rise above a predetermined level.

The installation of additional mechanical ventilators in order to meet building code ventilation requirements significantly increases construction costs. Apart from the cost of additional exhaust fans and dehumidistats, considerable labour is required to install the extra ducting necessary to exhaust the ventilated air to the exterior of the dwelling.

Kitchen range hood fans for ventilating grease-laden air generated during cooking are well known. Typically such fans are manually activated using a toggle switch. Conventional range hood fans are not suitable for providing automatic mechanical ventilation since they are excessively noisy and would tend to awaken sleeping occupants of a dwelling when automatically activated at night. Accordingly, the need has arisen for a novel range hood fan electrically connectable to a humidity sensor, such as a dehumidistat, which is operable at a reduced sound level in an automatic mode.

Some automatic operating devices for range hood fans are known in the prior art. Japanese patent No. 0,213,628, which issued to Mitsubishi Electric Corp. on 9 Sep., 1987, discloses an operating device for activating a range hood fan in response to changes in atmospheric temperature as measured by a temperature sensing part located near the range hood. However, neither range hood fans in general, nor such automatically operating range hood fans as disclosed by Mitsubishi, operate to automatically ventilate dwellings in response to build-up of humidity and attendant increases in the concentration dangerous gases within residential dwellings.

SUMMARY OF THE INVENTION

The inventor has recognized that in order to facilitate the reduction of costs in the construction of dwellings, without sacrificing air quality, an existing apparatus must be developed that will provide a multiplicity of functions. Therefore a kitchen range hood, that is already equipped to handle air removal from the dwelling when manually activated during cooking, has been modified to incorporate both its existing features, and the features of costly additional mechanical ventilation units. This has been accomplished in a manner that will reduce noise disturbances to sleeping occupants of the dwelling.

The inventor has developed a kitchen range hood fan with an atmospheric humidity sensor which automatically turns on the kitchen range hood fan at a low speed setting when humidity levels in a dwelling exceed a pre-set limit. The invention provides a minimum ventilation rate of 50 CFM in its automatic mode, and further provides, in its automatic mode, a sound level not exceeding 65 dBA.

Preferably, the invention incorporates a kitchen range hood, an automatic operating device, and a dehumidstat in combination. Depending on the size of the dwelling, a kitchen range hood constructed in accordance with the invention could result in considerable cost savings. Such cost savings would be the result, depending on the size of the building, of either the reduction or complete elimination of extra mechanical ventilators, associated wiring and ducting, and labour costs associated with the extra mechanical ventilator installations.

More particularly, the invention relates to a range hood fan operable in a manual or an automatic mode. The fan includes a housing having an air inlet aperture and an air outlet aperture and a fan blower mountable within the housing. At least one motor mountable within the housing is provided for optionally driving the fan blower at either a high speed setting for maximal air output or a low speed setting for minimal air output. The fan has a sound level not exceeding 65 dBA when operating at the low speed setting. Manual control means are provided for manually operating the motor in the manual mode at either the high speed setting or the low speed setting. Automatic control means are also provided for automatically operating the fan motor in the automatic mode at the low speed setting. The automatic control means is responsive to electrical signals received from a humidity sensor located at a position remote from the fan.

Preferably the humidity sensor is a dehumidistat and the automatic control means is an electrical circuit for electrically connecting the dehumidistat directly to the fan motor.

Advantageously, the minimum ventilation rate of the fan when operating at the low speed setting is 50 Cfm and the minimum ventilation rate of the fan when operating at the high speed setting is 100 Cfm.

The fan may further include an exhaust duct, in communication with the air outlet, which is readily accessible for cleaning or servicing. Preferably the exhaust duct has a minimum inner diameter of 5 inches and the length of the duct accessible for cleaning and servicing extends for at least 12 inches.

In an alternative embodiment, the range hood fan may include first and second motors mountable within the housing for driving first and second blowers and the automatic control means is adapted to operate one of the first and second motors at the low speed setting in response to electrical signals received from the humidity sensor.

Advantageously, the manual control means is a control switch moveable between high, low and stand-by settings and the fan is operable in the automatic mode when the control switch is at the stand-by setting. Alternatively, the manual control means may consist of a first switch moveable between an on and a stand-by setting and a second switch moveable between a high and a low setting. In this alternative embodiment, the fan is operable in the automatic mode when the first switch is at the stand-by setting.

BRIEF DESCRIPTION OF THE DRAWINGS

In drawings which illustrate embodiments of the invention, but which should not be construed as restricting the spirit or scope of the invention in any way.

DETAILED DESCRIPTION OF THE PREFERRED EMBODIMENT

Figure 1:
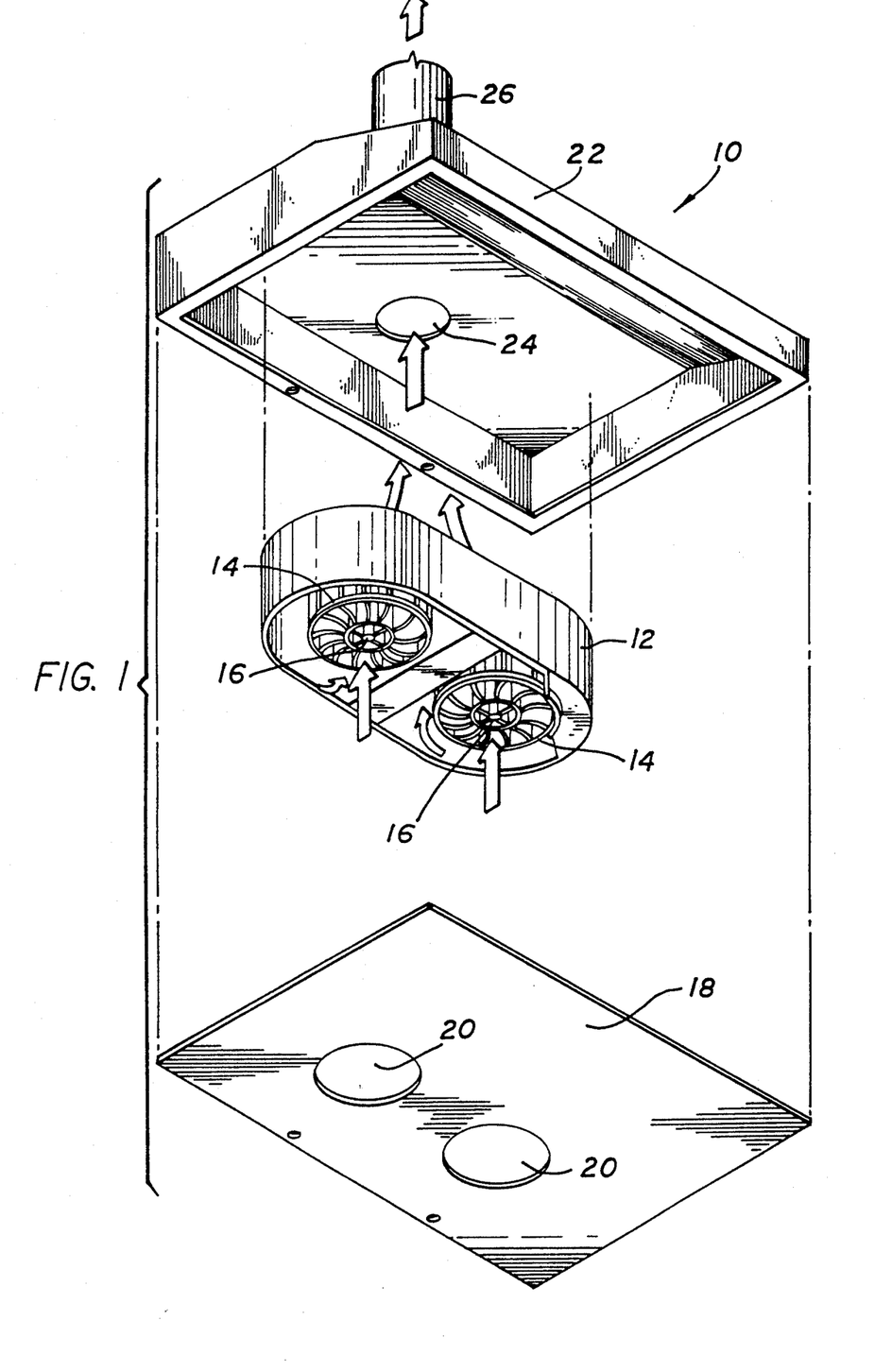
FIG. 1 is an exploded, bottom isometric view of the range hood fan assembly of the present invention.

The present invention contemplates the provision of a range hood fan which may be installed in the kitchen of a multiple-room dwelling. With reference to FIG. 1, range hood fan 10 is mountable above kitchen elements or burners to ventilate steam, grease and related odours generated during cooking. Range hood fan 10 includes a housing 12 for enclosing one or more fan blowers 14. In the embodiment illustrated in FIG. 1, two blowers 14 are provided which are each driven by a respective fan motor 16.

Fan housing 12 includes a bottom panel 18 having a pair of air inlets 20 underlying blowers 14 and a top panel 22 having at least one air outlet 24. Outlet 24 is in communication with an exhaust duct 26 extending above housing 12 for ventilating air to the exterior of the dwelling. The length of exhaust duct 26 readily accessible for periodic cleaning and servicing should preferably extend for at least 12 inches.

Figure 2A:
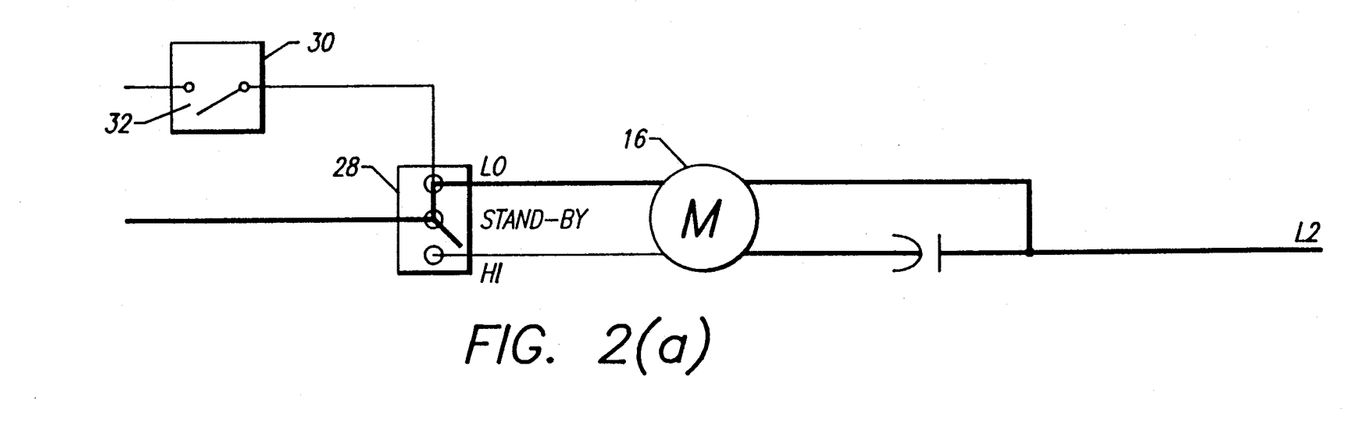
FIG. 2(a) is an electrical wiring diagram of a first embodiment of the invention having a single manual control switch and showing the switch configured for manual operation at the low speed setting.
Figure 2B:
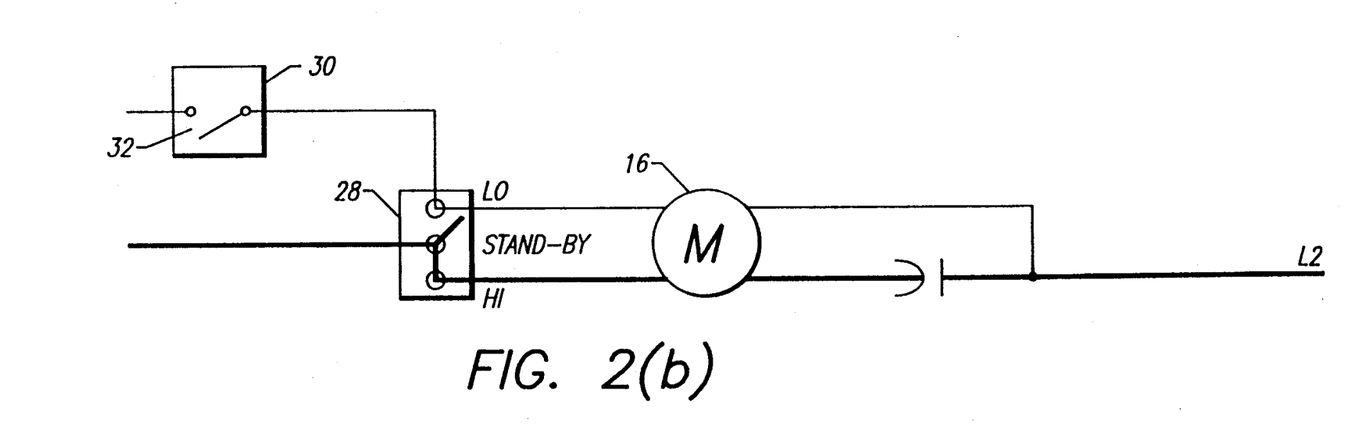
FIG. 2(b) is a wiring diagram of the fan of FIG. 2(a) showing the control switch configured for manual operation at the high speed setting.
Figure 2C:
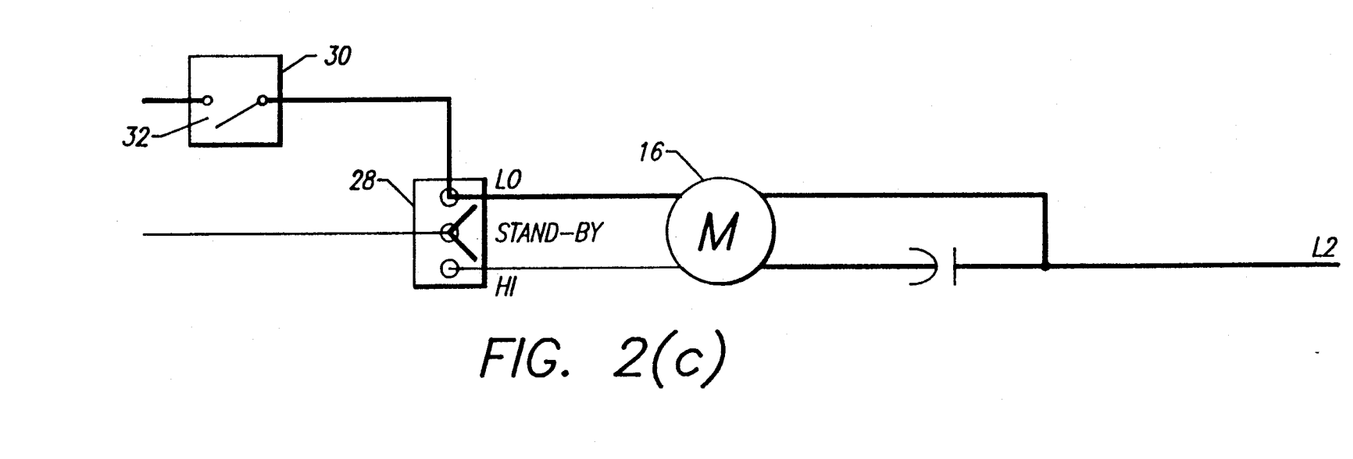
FIG. 2(c) is a wiring diagram of the fan of FIG. 2(a) showing the control switch configured for automatic operation at the low speed setting.

The present application relates specifically to a range hood fan 10 which is operable in either a manual or an automatic mode. With reference to the wiring diagrams shown in FIG. 2, fan 10 includes a three-position toggle control switch 28 for operating fan blowers 14 in the manual mode to ventilate grease-laden air generated during cooking. Switch 28 is preferably mounted on the exterior of fan housing 12 in a conventional manner for easy access.

When switch 28 is manually adjusted to the "low" position shown in FIG. 2(a), fan motor 16 is electrically activated to drive a corresponding blower 14 at a low speed for minimal air output. Similarly, with reference to FIG. 2(b), when switch 28 is adjusted to the "high" position, fan motor 16 is electrically activated to drive the corresponding blower 14 at a high speed for maximal air output.

Fan 10 may also be automatically activated when switch 28 is in the "off" or "stand-by" position shown in FIG. 2(c). In this automatic mode, operation of fan 10 is controlled by a humidity sensor, such as a dehumidistat 30, which is wired directly to at least one of the fan motors 16. Dehumidistat 30 measures the atmospheric humidity within the dwelling in question and includes a contact switch 32 for closing the electrical circuit to fan motor 16 when humidity readings rise above a pre-set level. Usually dehumidistat 30 is set for between 40%–60% relative humidity. A suitable dehumidistat is manufactured by Broan Limited of Mississauga, Ontario. Dehumidistat 30 is preferably mounted at a central location in the dwelling remote from fan 10. Optionally, dehumidstat 30 may be mounted directly on the fan housing or casing.

An important feature of the present invention is that it is not possible to disable the operation of fan motor 16 in the automatic mode. That is, it is not possible to turn fan 10 "off" in the automatic mode by adjusting control switch 28 (adjustment of switch 28 will cause fan 10 to operate manually at either the high or low speed settings). If control switch 28 is left in the "off" or "stand-by" position, fan 10 will continue to operate in the automatic mode at the low speed setting until humidity readings within the dwelling fall below the pre-set level and dehumidistat 30 is deactivated.

Figure 3A:
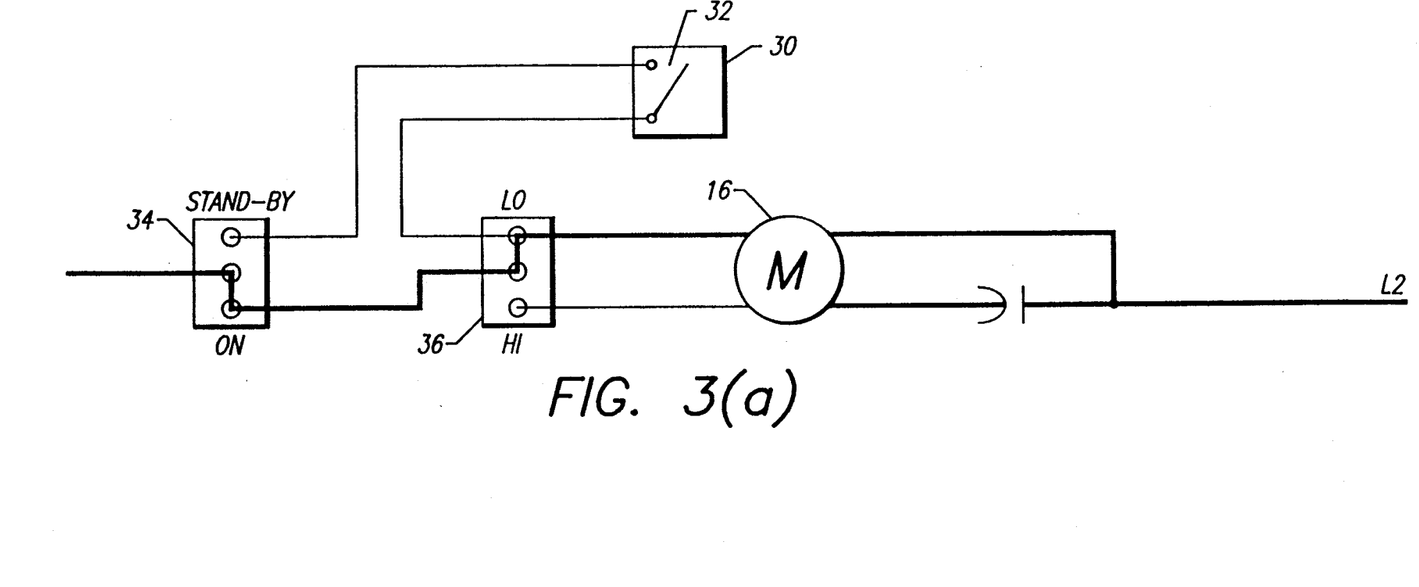
FIG. 3(a) is an electrical wiring diagram of a second embodiment of the invention having a pair of manual control switches showing the switches configured for manual operation at the low speed setting.
Figure 3B:
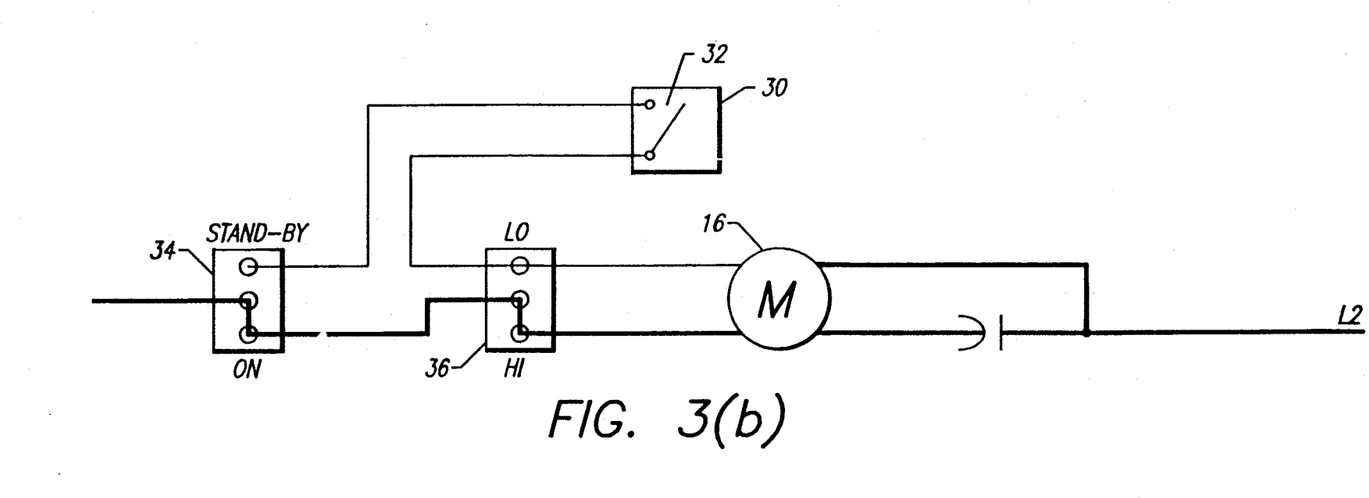
FIG. 3(b) is electrical wiring diagram of the fan of FIG. 3(a) showing the control switches configured for manual operation at the high speed setting.
Figure 3C:
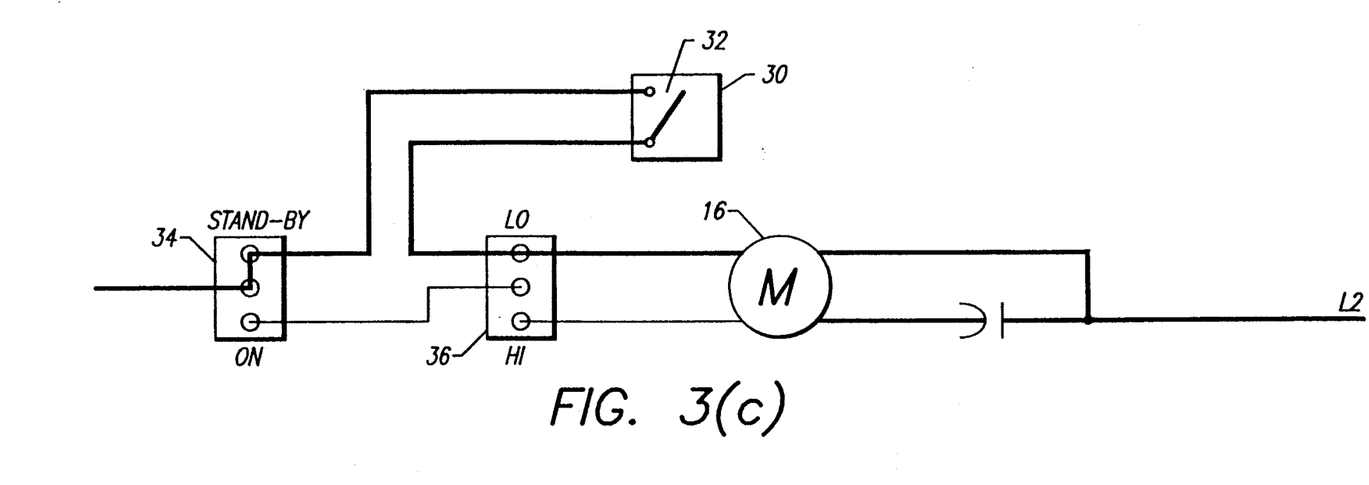
FIG. 3(c) is an wiring diagram of the embodiment of FIG. 3(a) showing the control switches configured for automatic operation at the low speed setting.

FIGS. 3(a)–3(c) illustrate an alternative embodiment of the invention having a pair of two-position toggle control switches 34 and 36. Switch 34 is provided for activating fan motor 16 in the manual mode and is adjustable between an "on" and an "off" or "stand-by" position. Switch 36 is provided for switching fan motor 16 between the "low" and "high" speed settings when switch 34 is in the "on" position.

When switch 34 is in the "off" or "stand-by" position, fan motor 16 may be automatically activated by dehumidistat sensor 30 when humidity levels within the dwelling exceed a pre-set limit as described above. As shown in FIG. 3(c), fan 10 is wired so that motor 16 will operate at the low speed setting in the automatic mode, irrespective of the position of switch 36. As discussed above, it is not possible to disable operation of fan motor 16 in the automatic mode.

Figure 4:
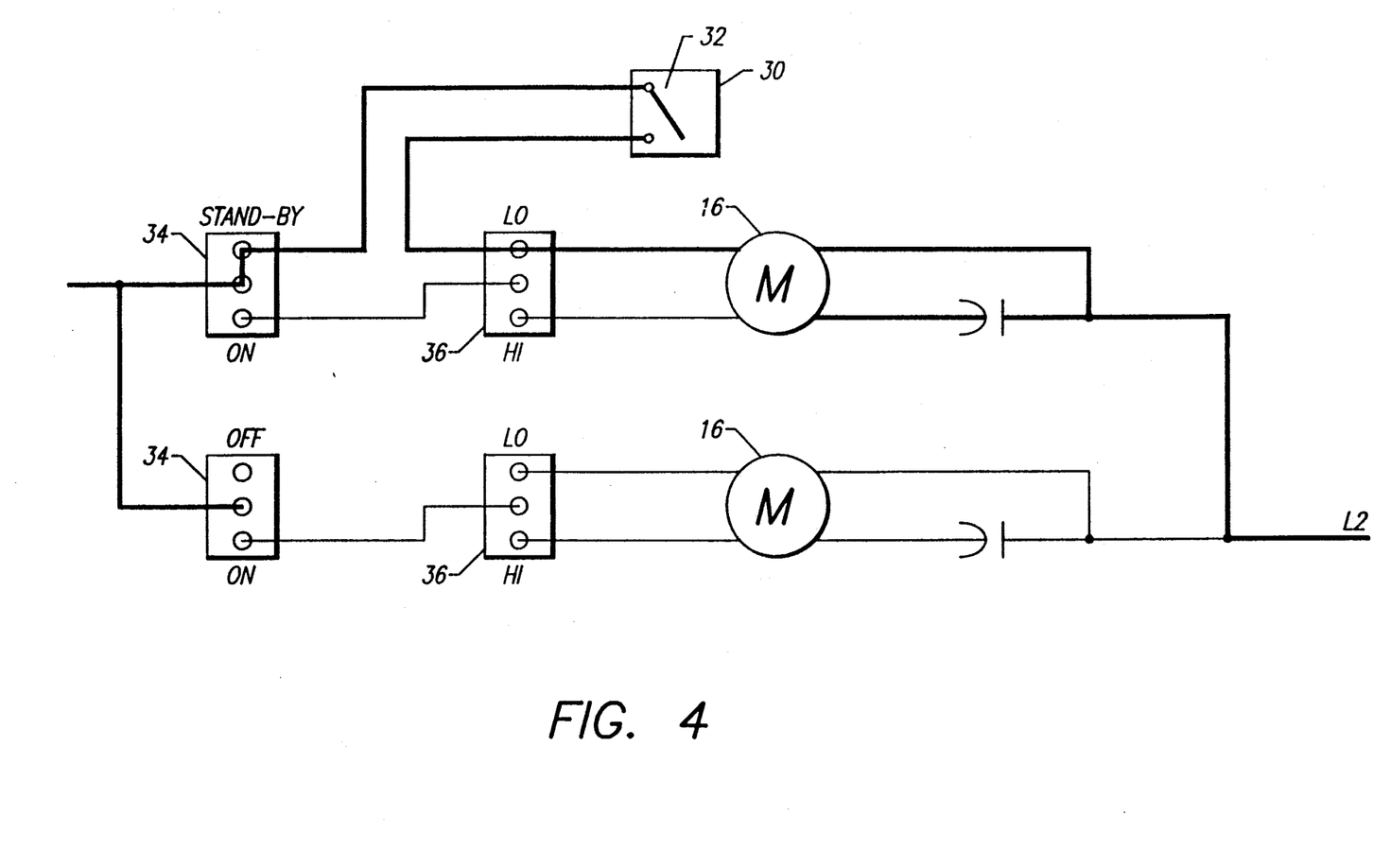
FIG. 4 is an electrical wiring diagram showing the switch configuration of FIG. 3 for use with two separate fan motors for driving dual fan blowers.

FIG. 4 illustrates a further alternative embodiment of the invention showing a suitable wiring diagram if two fan motors 16 are provided for driving a corresponding pair of dual blowers 14. Each motor 16 is controlled by a pair of two-position control switches 34 and 36 as described above. In the embodiment shown in FIG. 4, dehumidistat 30 is wired to only one of the fan motors 16 for operation of one of the dual blowers 14 in the automatic mode. Again, the fan motor 16 wired to dehumidistat 30 will be automatically activated at the "low" speed setting in response to elevated humidity readings, even if each of the switches 34 is in the "off" or "stand-by" position.

Figure 4A:
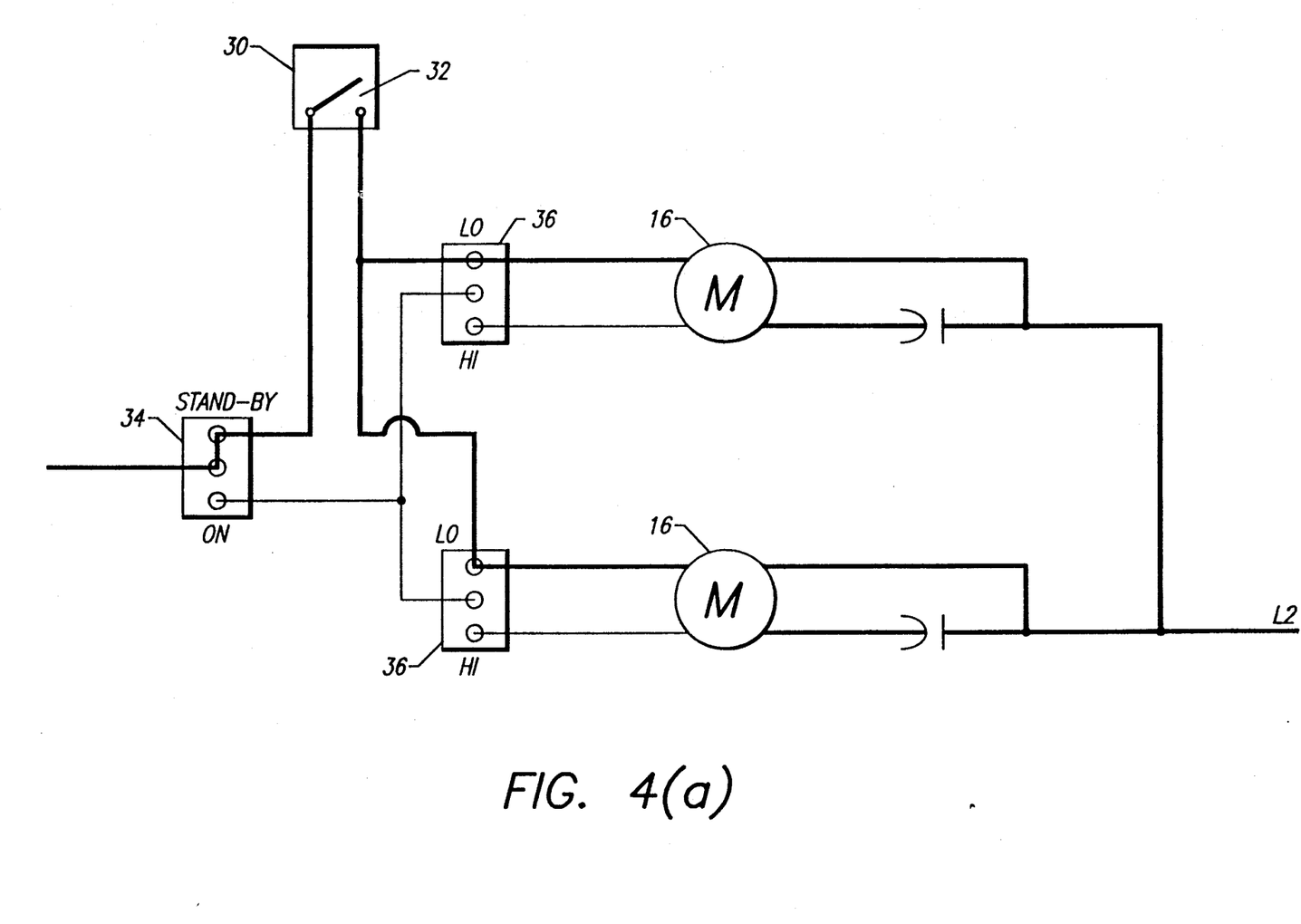
FIG. 4(a) is an electrical wiring diagram of an alternative embodiment of the invention showing the humidity sensor wired to two separate fan motors for maximal air output in the automatic mode.

Alternatively, dehumidistat 30 may be wired to activate both motors 16 as shown in FIG. 4(a) for maximal air output in the automatic mode. An electronic control device (not shown) could be provided for activating one or both of fan motors 16 depending upon humidity levels as measured by sensor 30. For example, if humidity levels are extremely high and a large volume of interior air must be ventilated from the dwelling, both fan motors 16 could be automatically activated.

The primary advantage of the present invention is that fan 10 serves the dual function of operating as a conventional, manually controlled kitchen range hood fan for ventilating odours and steam generated during cooking and an automatically controlled exhaust fan to maintain humidity levels within the dwelling at an optimum level.

At present, exhaust fans for regulating humidity levels are typically installed by building contractors in washrooms to facilitate duct work connections. However, in many residential dwellings, washrooms are located immediately adjoining the sleeping quarters. Accordingly, when such exhaust fans are automatically activated at night in response to elevated humidity readings, as measured by a dehumidistat sensor, the occupants of the dwelling may be awakened. Such occupants may well be inclined to switch the dehumidistat sensor off completely in order to avoid further disturbance, which obviously defeats the purpose of the automatic ventilation system. By contrast, kitchen range hood fans are typically located far enough away from the dwelling's sleeping quarters such that the building occupants would not be disturbed at night when the fan is automatically activated.

As indicated above, the applicant's fan 10 is designed so that it will operate in the automatic mode only at the low speed setting. This ensures that fan 10 will operate relatively quietly in the automatic mode, preferably at a sound level not exceeding 65 dBA. By contrast, most conventional range hood fans are far too noisy to function as automatic mechanical ventilators and could not meet regulatory requirements. Accordingly, building contractors are compelled at present to install a separate sound-rated automatic ventilation system as described above which significantly increases the cost of constructing new dwellings.

It is also important that fan 10 have a suitable ventilation output in both the automatic and manual modes in order to comply with regulatory requirements. The Building Code of British Columbia, Canada may be usefully considered by way of example. This Code provides that all new dwelling units must include a mechanical ventilation system capable of providing, during the heating season, at least 0.5 air changes per hour. Other Code provisions stipulate minimum ventilation rates calculated with reference to the interior volume of the dwelling in question. For example, a building having a floor area of 2,400 square feet and standard eight foot ceilings must have mechanical ventilators installed having a minimum capacity of 180 CFM (cubic feet of air per minute).

As indicated above, in order to comply with the above provisions, building contractors at present ordinarily install one or more exhaust fans in washrooms or other easily accessible locations within the dwelling For larger dwellings both a manually controlled fan and an automatically controlled fan wired to a dehumidistat must be installed to meet the minimum ventilation rate requirements. For larger residential dwellings, the Code requirements cannot be met with an automatically controlled fan alone since such a fan would be excessively noisy.

The present invention eliminates or reduces the need to install a separate automatic ventilation system by providing a kitchen range hood fan 10 which may be operated in both a manual and an automatic mode. When operating at the low speed setting, in either the manual or automatic mode, the minimum capacity of fan 10 is preferably 50 Cfm. The minimum capacity of the fan at the high speed setting in the manual mode is preferably 100 Cfm.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A kitchen range hood fan operable in a manual or an automatic mode comprising:
   (a) a housing having an air inlet aperture and an air outlet aperture;
   (b) at least one fan blower mountable within said housing;
   (c) at least one motor mountable within said housing for optionally driving said fan blower at either a high speed setting for maximal air output or a low speed setting for minimal air output, wherein said fan has a sound level not exceeding 65 dBA when operating at said low speed setting;
   (d) manual control means for manually operating said motor in said manual mode at either said high speed setting or said low speed setting; and
   (e) automatic control means for automatically operating said motor in said automatic mode at said low speed setting, wherein said automatic control means is responsive to electrical signals received from a humidity sensor located at a position remote from said fan.

2. The range hood fan of claim 1, wherein said humidity sensor is a dehumidistat and wherein said automatic control means comprises an electrical circuit for electrically connecting said dehumidistat directly to said fan motor.

3. The range hood fan of claim 2, wherein the minimum ventilation rate of said fan when operating at said low speed setting is 50 Cfm.

4. The range hood fan of claim 2, wherein the minimum ventilation rate of said fan when operating at said high speed setting is 100 Cfm.

5. The range hood fan of claim 2, further comprising an exhaust duct in communication with said air outlet having a minimum inner diameter of 5 inches and a length of at least 12 inches readily accessible for cleaning and servicing.

6. The range hood fan of claim 1, wherein said manual control means comprises a control switch movable between high, low and stand-by settings and wherein said fan is operable in said automatic mode when said manual control switch is at said stand-by setting.

7. The range hood fan of claim 1, wherein said manual control means comprises a first switch moveable between an on and a stand-by setting and a second switch moveable between a high and a low setting, and wherein said fan is operable in said automatic mode when said first switch is at said stand-by setting.

8. The range hood fan of claim 1, comprising first and second motors mountable within said housing for driving first and second blowers, wherein said automatic control means is adapted to operate one of said first and second motors at said low speed setting in response to electrical signals received from said humidity sensor.

9. A mechanical ventilating device operable in a manual or an automatic mode for use in a multiple-room dwelling, comprising:
 (a) a range hood fan mountable in the kitchen of said dwelling, said fan comprising:
  (i) a housing having an air inlet aperture and an air outlet aperture;
  (ii) at least one fan blower mountable within said housing; and
  (iii) at least one motor mountable within said housing for optionally driving said fan blower at either a high speed setting for maximal air output or a low speed setting for minimal air output, wherein said fan has a sound level not exceeding 65 dBA when operating at said low speed setting;
 (b) a remote humidity sensor located in a dwelling room other than said kitchen for measuring changes in humidity within said dwelling;
 (c) manual control means for manually operating said motor in said manual mode at either said high speed setting or said low speed setting; and
 (d) automatic control means for automatically operating said fan motor in said automatic mode at said low speed setting in response to electrical control signals received from said remote sensor.

10. The mechanical ventilating device of claim 9, wherein the minimum ventilation rate of said fan at said low speed setting is 50 Cfm.

11. The mechanical ventilating device of claim 9, wherein the minimum ventilation rate of said fan at said high speed setting is 100 Cfm.

12. The mechanical ventilating device of claim 9, further comprising an exhaust duct in communication with said air outlet having a minimum inner diameter of 5 inches and a length of at least 12 inches readily accessible for cleaning or servicing.

13. The mechanical ventilating device of claim 9, wherein said manual control means comprises a control switch movable between high, low and stand-by settings and wherein said fan is operable in said automatic mode when said manual control switch is at said stand-by setting.

14. The mechanical ventilating device of claim 9, wherein said manual control means comprises a first switch moveable between an on and a stand-by setting and a second switch moveable between a high and a low setting, and wherein said fan is operable in said automatic mode when said first switch is at said stand-by setting.

15. The mechanical ventilating device of claim 9, comprising first and second motors mountable within said housing for driving first and second blowers, wherein said automatic control means is adapted to operate one of said first and second motors at said low speed setting in response to electrical signals received from said humidity sensor.

16. The mechanical ventilating device of claim 9, wherein said humidity sensor is a dehumidistat wired directly to said fan motor.

17. A mechanical ventilating device operable in a manual or an automatic mode for use in a multiple-room dwelling, comprising:
 (a) a range hood fan mountable in the kitchen of said dwelling, said fan comprising:
  (i) a housing having an air inlet aperture and an air outlet aperture;
  (ii) at least one fan blower mountable within said housing; and
  (iii) at least one motor mountable within said housing for optionally driving said fan blower at either a high speed setting for maximal air output or a low speed setting for minimal air output, wherein said fan has a sound level not exceeding 65 dBA when operating at said low speed setting;
 (b) a humidity sensor mounted on said fan housing for measuring changes in humidity within said dwelling;
 (c) manual control means for manually operating said motor in said manual mode at either said high speed setting or said low speed setting; and (d) automatic control means for automatically operating said fan motor in said automatic mode at said low speed setting in response to electrical control signals received from said humidity sensor.

* * * * *